US011979205B1

(12) United States Patent
Yuan et al.

(10) Patent No.: US 11,979,205 B1
(45) Date of Patent: May 7, 2024

(54) METHOD FOR CONFIGURING AND UPDATING RANDOM ACCESS RESOURCES IN MULTI-ANTENNA MIMO ENVIRONMENT

(71) Applicant: ZHEJIANG UNIVERSITY CITY COLLEGE, Hangzhou (CN)

(72) Inventors: Jiantao Yuan, Hangzhou (CN); Rui Yin, Hangzhou (CN); Anping Wan, Hangzhou (CN); Tao Fang, Hangzhou (CN); Jinglin Wang, Hangzhou (CN); Tianmin Shan, Hangzhou (CN)

(73) Assignee: ZHEJIANG UNIVERSITY CITY COLLEGE (CN)

( * ) Notice: Subject to any disclaimer, the term of this patent is extended or adjusted under 35 U.S.C. 154(b) by 0 days.

(21) Appl. No.: 17/795,644

(22) PCT Filed: Apr. 2, 2022

(86) PCT No.: PCT/CN2022/084960
§ 371 (c)(1),
(2) Date: Jul. 27, 2022

(87) PCT Pub. No.: WO2023/071055
PCT Pub. Date: May 4, 2023

(30) Foreign Application Priority Data

Oct. 25, 2021 (CN) .......................... 202111239199.X

(51) Int. Cl.
*H04W 4/00* (2018.01)
*H04B 7/0413* (2017.01)
(Continued)

(52) U.S. Cl.
CPC .......... *H04B 7/0413* (2013.01); *H04W 72/53* (2023.01); *H04W 74/0833* (2013.01)

(58) Field of Classification Search
CPC . H04B 7/0413; H04W 72/53; H04W 74/0833
See application file for complete search history.

(56) References Cited

U.S. PATENT DOCUMENTS

| 2017/0272138 A1 | 9/2017 | Chun et al. |
| 2022/0086786 A1* | 3/2022 | Narasimha ........ H04W 56/0005 |

FOREIGN PATENT DOCUMENTS

| CN | 107770733 A |   | 3/2018 |           |
| CN | 109845378 A | * | 6/2019 | ........... H04L 5/0055 |

(Continued)

OTHER PUBLICATIONS

International Search Report for PCT Application No. PCT/CN2022/084960 dated Jun. 14, 2022, 5 pages.

(Continued)

*Primary Examiner* — Thai D Hoang
(74) *Attorney, Agent, or Firm* — Dickinson Wright PLLC

(57) ABSTRACT

A method for configuring and updating random access resources in a multi-antenna multiple-input multiple-output (MIMO) environment is provided, including: initializing a base station; broadcasting, by the base station, the available RACH resources using an SIB2; initiating, by users who have data to be sent in an uplink, random access processes on the RACH resources configured by the base station; and redefining an S state, an I state, and a C state. Configuration of the RACH resources may be gradually and dynamically optimized according to the quantity of antennas of the base station and a utilization rate threshold of the RACH resources, so that waste of random access RACH resources is reduced provided that an MIMO system meets a required user/service access success probability; a utilization of the resources is improved by fully utilizing spatial diversity characteristics of the MIMO system.

6 Claims, 4 Drawing Sheets

(51) Int. Cl.
*H04W 72/53* (2023.01)
*H04W 74/0833* (2024.01)

(56) References Cited

FOREIGN PATENT DOCUMENTS

| | | | | | |
|---|---|---|---|---|---|
| CN | 109874175 | A | | 6/2019 | |
| CN | 109891797 | A | | 6/2019 | |
| CN | 110139249 | A | | 8/2019 | |
| CN | 110602788 | A | | 12/2019 | |
| CN | 111294775 | A | | 6/2020 | |
| CN | 113692060 | A | | 11/2021 | |
| CN | 114128193 | A | * | 3/2022 | ........... H04L 1/1607 |
| CN | 114641960 | A | * | 6/2022 | ........... H04L 1/1685 |
| CN | 117083829 | A | * | 11/2023 | ........... H04L 5/0023 |
| WO | WO-2019098713 | A1 | * | 5/2019 | ........ H04W 52/0216 |
| WO | WO-2020197355 | A1 | * | 10/2020 | .............. H04W 4/70 |

OTHER PUBLICATIONS

First Office Action with English Translation for Chinese Application No. 202111239199.X, dated Dec. 1, 2021, 8 pages.
Notification of Grant with English Translation for Chinese Application No. 202111239199.X, dated Dec. 15, 2021, 2 pages.
Wang et al., "Minority Game for Distributed User Association in Unlicensed Heterogenous Networks," IEEE Transactions on Wireless Communications, Jun. 2020, 14 pages, vol. 19, No. 6.

* cited by examiner

METHOD FOR CONFIGURING AND UPDATING RANDOM ACCESS RESOURCES IN MULTI-ANTENNA MIMO ENVIRONMENT

CROSS REFERENCE TO RELATED APPLICATION(S)

This present application is a national stage application of International Patent Application No. PCT/CN2022/084960, filed Apr. 2, 2022, which claims priority to Chinese Patent Application No. 202111239199.X, filed with the China National Intellectual Property Administration on Oct. 25, 2021, and entitled "METHOD FOR CONFIGURING AND UPDATING RANDOM ACCESS RESOURCES IN MULTI-ANTENNA MIMO ENVIRONMENT," which are incorporated herein by reference in their entireties.

TECHNICAL FIELD

The present disclosure belongs to the field of wireless communication, and in particular, to a method for configuring and updating random access resources on a base station side in a multiple-input multiple-output (MIMO) system.

BACKGROUND ART

In September 2015, the International Telecommunication Union clarified, according to requirements of a data transmission rate, a delay, the number of connections and reliability of a terminal service, three main application scenarios of 5G: enhanced mobile broadband (eMBB), massive machine type communication (mMTC) and ultra-reliable and low latency communication (URLLC). The three application scenarios have different requirements for indicators such as the rate, reliability, and delay. The eMBB is mainly oriented to people-centered wide-area continuous coverage and local hotspot coverage communication for meeting data transmission of large-traffic services, which brings users a faster and more extreme experience. The mMTC is mainly oriented to applications such as data acquisition and transmission in Internet of Things (IoT) involving massive nodes, which has features such as low power consumption and massive connections. The URLLC is mainly oriented to special industry applications that have extremely high requirements for transmission delay and communication reliability. Therefore, to better support diverse application scenarios and explore possibility of supporting services with strict QoS requirements, resources need to be configured according to a service load (e.g., the quantity of users) of a wireless system. Limited wireless resources may be better utilized provided that the service load (e.g., the quantity of users) is accurately estimated in the wireless network.

In practice, in current cellular wireless communication (such as 4G or 5G), several fixed configurations are used for random access channel (RACH) resources. However, with fixed configuration of the RACH resources, the RACH resources are not fully utilized when the quantity of uplink random access users in the system is relatively small, resulting in idleness and waste of the resources. Conversely, when the quantity of the uplink random access users is relatively large, insufficient RACH resources will cause a severe access collision among a plurality of uplink users initiating random accesses on limited RACH resources, such that the users cannot access to the wireless communication system for services in a short time.

An existing cellular wireless communication system has a fixed configuration of RACH resources. In the case, when the quantity of the uplink random access users is relatively small, the RACH resources are not fully utilized, resulting in idleness and waste of the RACH resources. Conversely, when the quantity of uplink random access users is relatively large, insufficient RACH resources causes a severe access collision among a plurality of uplink users initiating random accesses on limited RACH resources, such that the users cannot access to the wireless communication system for services in a short time. In addition, when the users initiate random access requests, it is considered a collision if more than one user uses the same RACH resource. Actually, due to a spatial degree of freedom in the MIMO system, when K receiving antennas are configured on the base station side, data simultaneously sent by K users can be simultaneously distinguished at most. That is, it is considered a collision when more than K users use the same RACH resource. Therefore, the configuration of the RACH resources in the existing random access protocol is not adjusted in time with a dynamic change of the quantity of users, so that a space advantage of MIMO technology in a new generation cellular system cannot be fully exploited.

SUMMARY

The present disclosure aims to overcome defects in the conventional art, and provides a method for configuring and updating random access resources in an MIMO system.

The method for configuring and updating the random access resources in the MIMO system includes the following steps:

step 1: initializing a base station: configuring available random access channel (RACH) resources $R_2$, that is, providing an optional RACH configuration randomly or according to statistical information of a quantity of users in Table 5.7.1-2 in the National Standardization Organization 3rd Generation Partnership Project (3GPP) specification TS38.211; and setting an initial value of a utilization rate $\eta$ of the RACH resources to 0, and setting an initial value of a quantity M of updates of the RACH resources to M=0;

step 2: broadcasting, by the base station, the available RACH resources $R_2$ through a system information block SIB2, where in a 5G new radio (NR) system, because a multi-antenna MIMO technology is used, when the base station is provided with K receiving antennas, a maximum spatial degree of freedom is K, and the base station may distinguish sequences or signals of K users at most each time;

step 3: initiating, by users who have data to be sent in an uplink, random access processes on the RACH resources configured by the base station; and step 4: a spatial degree of freedom formed by a plurality of antennas of the base station in the MIMO system is represented by K, a quantity of users who initiate random accesses on a certain RACH resource is represented by N, a result on the RACH resource is represented by F, and an S state, an I state, and a C state are redefined; and an initial value of N is 0, where when the base station predicts and estimates a value of N, N is obtained through paging configuration of the base station in a non-contention-based random access manner, and is obtained through estimation by using a long short-term memory network (LSTM) in a contention-based random access manner;

step 5: comparing, by the base station, a statistical utilization rate η of the RACH resources with a preset utilization rate threshold $η_{Threshold}$ of the RACH resources, and determining whether η exceeds the preset threshold $η_{Threshold}$; and performing step 6 and step 7 if $η<η_{Threshold}$ is met; otherwise, performing step 8;

step 6: increasing, by the base station, a value of the quantity M of updates of the RACH resources by 1: M=M+1;

step 7: obtaining, by the base station, an updated quantity $\overline{R_2}$ of RACH resources according to a RACH resource update function, where the update function is as follows:

$$\overline{R_2}=R_2+\lceil α_M R_2 \rceil$$

where, a non-negative number $α_M$ is a weight value when the base station updates the RACH resources for an $M^{th}$ time, and is used for controlling an update amount of the RACH resources; $\lceil · \rceil$ represents a round-up operation, which is used for ensuring that a quantity of RACH resources after each update is an integer multiple a minimum quantity of resource blocks in a cellular communication system; $\lceil α_M R_2 \rceil$ is a quantity of newly added RACH resources with a configured utilization rate of the RACH resources not less than a set threshold; and the non-negative number $α_M$ is adjusted to ensure that the number increased each time is close to an optimal configuration, and step 3 to step 5 are repeated until $η≥η_{Threshold}$; and step 8: searching for configuration of the RACH resources closest to a current value $R_2$ in a 3GPP relevant standard table, to configure the base station, resetting the utilization rate η of the RACH resources in the base station to the initial value 0, and the quantity M of updates of the RACH resources to M=0, and ending a update process of the RACH resources.

In one embodiment, in step 1, the base station includes: a processor and a transceiver, where the processor is connected to the transceiver; and the processor is configured to update parameter values in a RACH process, and the transceiver is configured to implement broadcast of RACH configuration and parse received preambles.

In one embodiment, in step 1, the base station further includes a memory, and the memory is configured to store updated configuration information of RACH and intermediate quantities in a RACH process, for example, statistics of the S/I/C states.

In one embodiment, the transceiver may specifically include a receiver and a transmitter; the processor is at least one of a central processing unit (CPU), a general-purpose processor, a digital signal processor (DSP), an application-specific integrated circuit (ASIC), a field programmable logic gate array (FPGA), another programmable logic device, a transistor logic device, and a hardware component; and the processor and the transmitter are connected through a bus.

In one embodiment, the memory is a read-only memory (ROM), another type of static storage device that can store static information and instructions, a random access memory (RAM), another type of dynamic storage device that can store information and instructions, an electrically erasable programmable read-only memory (EEPROM), a compact disc read-only memory (CD-ROM), or another optical disc storage, optical disc storage (including a compact disc, a laser disc, an optical disc, a digital versatile disc, a Blu-ray disc, or the like), or a magnetic disc storage medium.

In one embodiment, in step 2, when the base station is provided with the K receiving antennas, the maximum spatial degree of freedom is K, and idle (I for short), success (S for short), and collision (C for short) on each RACH resource are specifically set as follows:

when a feedback result of the RACH resource is the I state, it indicates that a preamble sequence sent by the user is not detected on the RACH resource, and the RACH resource is idle;

when the feedback result of the RACH resource is the S state, it indicates that at least one but not more than the number of preamble sequences sent by the K users are detected, and the users successfully send the preamble sequences on the RACH resource; and when the feedback result of the RACH resource is the C state, it indicates that the preamble sequences sent by more than K users are detected, and a collision occurs on the RACH resource.

In one embodiment, the S state, the I state, and the C state are defined as follows:

$$F = \begin{cases} I, & \text{if } N = 0 \\ S, & \text{if } 1 ≤ N ≤ K \\ C, & \text{if } N > K \end{cases}$$

where, the I state indicates that the feedback result of the RACH resource is the idle state, the S state indicates that the user successfully sends the preamble sequence on the RACH resource, and the C state indicates that a collision occurs on the RACH resource; and the base station collects statistics on the utilization rate η of the RACH resources according to a total quantity of S states, a total quantity of I states, and a total quantity of C states on all detected RACH resources:

$$η = \frac{N_S}{N_S + N_I + N_C} = \frac{N_S}{R_1 R_2}$$

where, $N_S$ is a total quantity of S states on all the RACH resources; $N_I$ is a total quantity of I states on all the RACH resources; $N_C$ is a total quantity of C states on all the RACH resources; $R_1$ is a quantity of preambles in a random access preamble set; $R_2$ is a quantity of available RACH resources; and η is a utilization rate of all the RACH resources.

In one embodiment, in step 8, the relevant standard table is Table 5.7.1-2 in the 3GPP specification TS38.211.

Beneficial effects of the present invention are as follows:

The present disclosure provides a method for configuring and updating uplink random access RACH resources on a base station side in an MIMO system. In the present disclosure, configuration of the RACH resources may be gradually and dynamically optimized according to the quantity of antennas of the base station and a utilization rate threshold of the RACH resources, so that the waste of random access RACH resources in the system is reduced provided that the MIMO system meets user/service access success probability requirements.

In addition, the designed configuration of the uplink random access resources is related to the antenna configuration on the base station side, and the utilization rate of the resources can be improved by fully utilizing spatial diversity characteristics of the MIMO system; and the configuration update method is performed on the base station side, only configuration information of the random access resources needs to be changed on a base station side, and hardware does not need to be changed. In addition, a user terminal may be compatible with a random access protocol procedure in a conventional cellular wireless communication system without any change.

BRIEF DESCRIPTION OF THE DRAWINGS

To describe the technical solutions in embodiments of the present disclosure or in the conventional art more clearly, the following briefly describes the accompanying drawings required by the embodiments. Apparently, the accompanying drawings in the following description show merely some embodiments of the present disclosure, and a person of ordinary skill in the art may still derive other accompanying drawings from these accompanying drawings without creative efforts.

Figure 1:
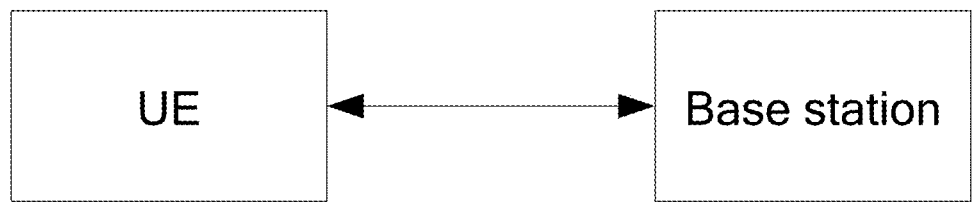
FIG. 1 is a network architecture diagram to which embodiments of the present disclosure are applicable.

Reference numerals: base station 500; processor 501; transceiver 502; memory 503; LSTM network 600; fully-connected (FC) network A700; and FC network B800.

DETAILED DESCRIPTION OF THE EMBODIMENTS

The present disclosure is further described below with reference to embodiments. The following description of the embodiments is only intended to help understand the present disclosure. It should be noted that a person of ordinary skill in the art may further make several modifications on the present disclosure departing from the principle of the present disclosure, but such improvements and modifications also fall within the protection scope of the claims of the present disclosure.

Figure 2:
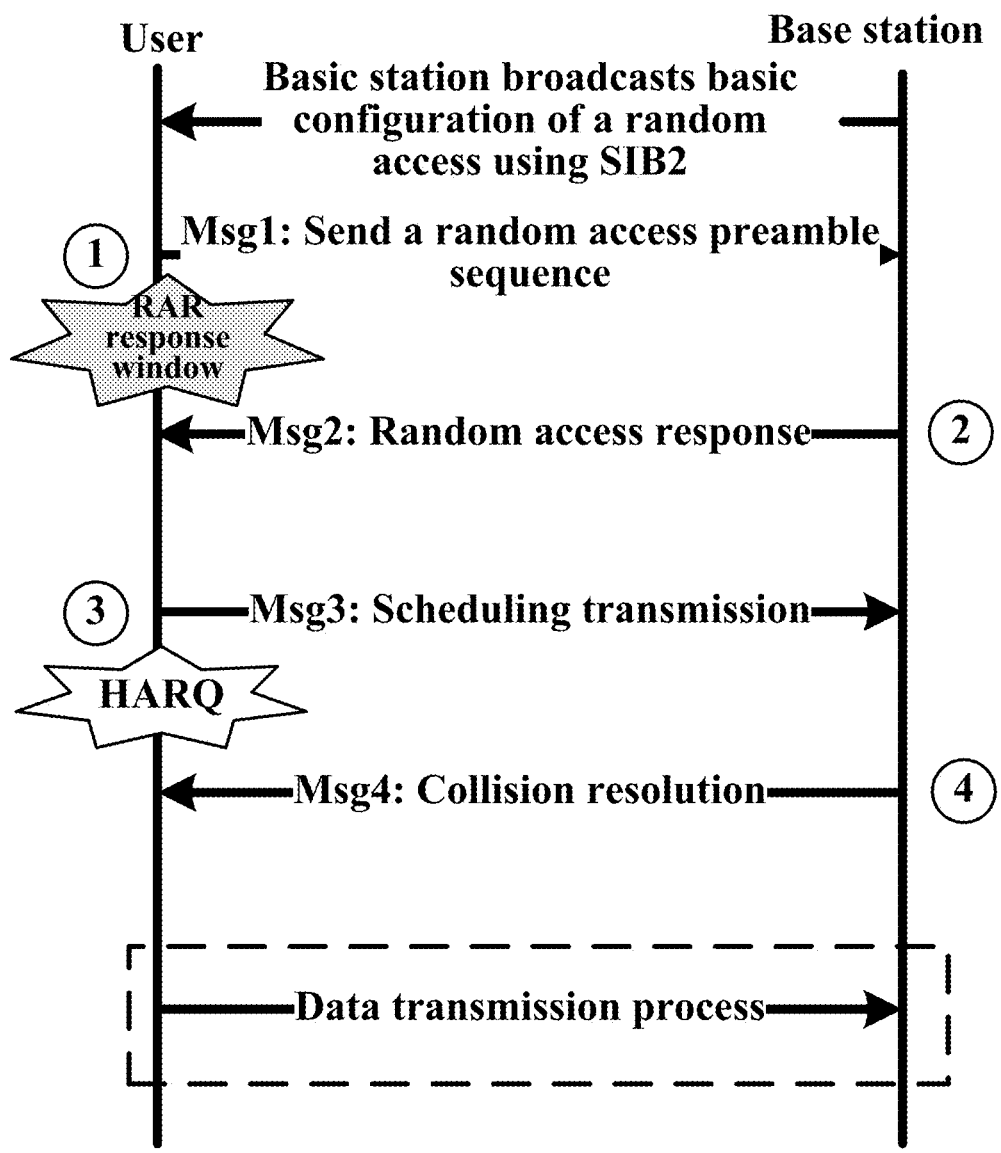
FIG. 2 is a flowchart of an implementation of a random access in an existing cellular wireless communication system.

As shown in FIG. 2, in an existing cellular system (such as a 5G new radio (NR) system), a random access process is initiated by a user on fixed random access resources configured by a base station. Two handshakes need to be completed in a basic procedure of a random access protocol in the existing cellular communication system which is divided into four steps:

Initialization: The base station sets, using a system information block 2 (SIB2) broadcast, configuration messages related to a random access, such as time-frequency domain position information of a physical random access channel (PRACH) and the quantity of configured RACH channels.

The first handshake includes step 1 and step 2.

In step 1, a user sends an Msg1 (random access preamble, namely, a preamble), and the base station receives the Msg1. The user obtains configuration information related to the random access from the SIB2 broadcast by the base station, then randomly selects a preamble from a random access preamble set (where the quantity of preambles in the random access preamble set is denoted by $R_1$), and sends the Msg1 on $R_2$ RACH resources indicated by the base station, that is, a PRACH. Correspondingly, the base station detects and decodes the Msg1 in a subframe configured with PRACH resources, to obtain a preamble identifier.

In step 2, the base station feeds back Msg2 (a random access response (RAR)), and the user receives the Msg2. The base station sends the Msg2 to the user on a physical downlink share channel (PDSCH) according to a result of the detected preamble, and sends downlink control information (DCI) indicating a position of the Msg2 on a physical downlink control channel (PDCCH). The Msg2 includes the preamble identifier decoded and obtained from step 1, a user identifier (a user identification code), uplink grant (UL grant) indicating a time-frequency domain position of Msg3 and retransmission information (a backoff parameter), and the like. The user monitors the PDCCH channel in a RAR window to obtain a downlink control message indicating the position of the Msg2 on the PDSCH, and receives and decodes the Msg2 at the corresponding position of the PDSCH. If the decoded preamble identifier obtained by the user is consistent with the preamble identifier of the user, a contention resolution process, that is, step 3, is performed; otherwise, the user randomly selects a value between 0 and the backoff parameter as a backoff value, and step 1 is performed on a first PRACH resource after backoff to 0.

In step 1, the user selects randomly a RACH resource to initiate a random access thereon, so in step 2, the result of the preamble detected by the base station on the RACH resource may have three cases: success (S for short), collision (C for short), and idle (I for short). The base station feeds back a result according to a state of the user accessing randomly to an initially configured random access channel resource. That is, if no user initiates a random access (sends a preamble) on a RACH resource, a result on the RACH resource is I. If only one user initiates a random access (sends a preamble) on a RACH resource, a result on the RACH resource is S; otherwise, a result on the RACH resource is C. Therefore, the quantity of users who initiate random accesses on a RACH resource is represented by N, and a result on the RACH resource is represented by F, where $$F = \begin{cases} I, & \text{if } N = 0 \\ S, & \text{if } N = 1 \\ C, & \text{if } N > 1 \end{cases}$$

Herein, an initial value of N is 0. When the RACH resource configuration is updated each time, the base station re-predicts and estimates the value of N. N is obtained through paging configuration of the base station in a non-contention-based random access manner, and is estimated and obtained by the base station according to a detection result of a preamble of a previous random access, using an LSTM in a contention-based random access manner. During the detection of the preambles in the contention-based random access manner, the base station may obtain states of the preambles, that is, the S/I/C state of each preamble sent by the base station in the MIMO system. A state set of the preambles on an $i^{th}$ random access timeslot in the MIMO system is represented by a triplet $T_i = \{I_i, S_i, C_i\}$.

The base station in the MIMO system estimates the quantity $N_i$ of active users by using a state of the observed random variable $$N_i = \begin{cases} \sum_{k=1}^{BW} N_{i-k,F}(k) + N_{i,A} & i > BW \\ \sum_{k=1}^{i-1} N_{i-k,F}(k) + N_{i,A} & i \leq BW \end{cases}$$

where BW is the quantity of timeslots included in a backoff window (BW) of a random access; $N_{i,A}$ is the quantity of newly activated users waiting to initiate random accesses when new data arrives on the $i^{th}$ random access timeslot; $N_{i-k,F}(k)$ is the quantity of users who reinitiate random accesses on the $i^{th}$ random access timeslot after random accesses fail due to a preamble collision on an $(i-k)^{th}$ random access timeslot. Therefore, a detection result $P(N_i)$ of the random accesses (that is, a probability distribution function of the quantity $N_i$ of activated users) is modeled as follows:

$$\arg\max_{N_i} P(N_i) \text{ s.t. } T_k, k = 1, \ldots, i \qquad \text{P1}$$

where $T_k$ (k=1, ..., i) is an observed value of the S/I/C state of each preamble sent by the base station in the MIMO system, $N_i$ is a result that needs to be predicted, and $T_k$ and $N_i$ are respectively used as an input and an output of a designed neural network. When the base station in the MIMO system estimates, by using the LSTM network, the quantity $N_i$ of users who initiate random accesses on any random access timeslot, a memory window length L of the LSTM network is required to be set to a larger value, for example, several times the BW length. This is because users with the random access collision need to randomly select a backoff value between 0 and BW to reinitiate random accesses when reinitiating the random accesses. If L is set to be too small, the LSTM network fails to memorize all retransmission users; and correspondingly, if L is set to be too large, computer's memory resources are wasted. By properly configuring L, redundant information can be discarded, and training of a neural network model can also be accelerated.

When N users randomly select $R_1$ preambles from a random access preamble set, and equiprobably initiate random accesses on $R_2$ RACH resources configured by the base station, a utilization rate η of the RACH resources is defined as a ratio of the total quantity of S states ($N_S$) to the total quantity of S states, the total quantity of I states ($N_I$) and the total quantity of C states $N_C$ on all the RACH resources detected by the base station, and η may be denoted by $$\eta = \frac{N_S}{N_S + N_I + N_C} = \frac{N \frac{1}{R_1 R_2} \left(1 - \frac{1}{R_1 R_2}\right)^{N-1}}{R_1 R_2} = \frac{N\left(1 - \frac{1}{R_1 R_2}\right)^{N-1}}{(R_1 R_2)^2}.$$

The second handshake, that is, a contention resolution process, includes step 3 and step 4.

In step 3, the user sends Msg3 (scheduling transmission), and the base station receives the Msg3. The user parses the Msg2 to obtain a UL Grant and a user identification code, and sends the Msg3 carrying the user identification code to the base station at a time-frequency domain position of an uplink shared channel (UL-SCH) indicated by the UL Grant. The base station monitors the Msg3 message on the UL-SCH.

Step 4: The base station feeds back Msg4 (collision resolution), and the user receives the Msg4. The base station receives and decodes the Msg3, and if the user identification code may be correctly decoded, the Msg4 is sent to the user on the PDSCH within a time duration of a contention resolution timer, and at the same time, a downlink control message carrying a position of the Msg4 is also sent on the PDCCH. The user monitors the PDCCH channel within the time duration of the contention resolution timer, to receive the downlink control message, and receives the Msg4 at a corresponding position of the PDSCH, which indicates that the user successfully completes the random access. When the user does not receive the Msg4 until the contention resolution timer expires, the quantity of Msg3 transmissions is increased by 1, and to determine whether to exceed the maximum quantity of allowed Msg3 transmissions. If not, step 3 is performed; and if yes, the quantity of Msg1 transmissions is increased by 1, to determine whether to exceed the maximum quantity of allowed Msg1 transmissions. If not, the backoff is performed according to a retransmission parameter, and then step 1 is performed; and if yes, it is considered that the random access of the user fails.

It can be learned from the utilization ratio η of the RACH resources that η is a function of $R_1$, $R_2$ and N. In the above formula, the base station may properly configure, according to a required utilization rate η of the RACH resources, the total quantity $R_1$ of preambles in the random access preamble set and the quantity $R_2$ of RACH resources configured by the base station. Generally, $R_1$ is fixed, and when the quantity N of users in the uplink random access is given, the minimum quantity $R_2$ of the RACH resources that meets a utilization rate threshold $\eta_{Threshold}$ of the RACH resources may be easily derived from the following optimization problem.

$$\min_{R_2} R_2$$

$$\text{Subject to } \eta = \frac{N\left(1 - \frac{1}{R_1 R_2}\right)^{N-1}}{(R_1 R_2)^2} \geq \eta_{Threshold}$$

It can be learned from the foregoing random access process that in the existing random access process, the result of the preambles detected by the base station on the RACH resources is not related to the quantity of antennas of the base station. Actually, in the MIMO system, when the base station is provided with K (K>1) antennas, data of K users can be simultaneously distinguished at the base station side according to a spatial degree of freedom formed by a plurality of antennas. That is, when the users initiate the random accesses, it may be considered a collision when more than K users use the same RACH resource. Therefore, in the existing random access protocol, a space advantage of the MIMO technology in a new-generation cellular system is not exploited well.

Embodiment 1

Embodiment 1 of this application provides a diagram of a network architecture to which the method for updating configuration of random access resources shown in FIG. 1 is applicable, including a base station and user equipment (UE). In the network architecture, a random access process is triggered by a user or the base station. A trigger condition includes an initial access of the user, for example, the UE being from an RRC_IDLE state to an RRC_CONNETTED state; and a wireless link reestablishment, to ensure that the UE reestablishes conditions such as a wireless connection and handover after a wireless link connection fails. In the random access process triggered by the user, the user initiates the random access process on a random access RACH resource configured by the base station; and in the random access process triggered by the base station, the base station first informs the user through broadcast or paging signaling, and the user then initiates the random access process on the random access RACH resource configured by the base station.

Like a conventional cellular communication system, in an MIMO system, a result on the RACH resource may have three cases: success (S for short), collision (C for short), and idle (I for short). If no user initiates a random access on a RACH resource, a result on the RACH resource is I. If there are users but no more than K users that initiate random accesses on the RACH resource, a result on the RACH resource is S; otherwise, a result on the RACH resource is C. However, the definition of the S/I/C states in the MIMO system is different from the definition of the S/I/C states in the conventional cellular communication system. In an MIMO system in which a base station is provided with K antennas, the quantity of users who initiate random accesses on a RACH resource is represented by N, and a result on the RACH resource is represented by F. The S/I/C states are defined as follows:

$$F = \begin{cases} I, & \text{if } N = 0 \\ S, & \text{if } 1 \leq N \leq K \\ C, & \text{if } N > K \end{cases}$$

Similar to the conventional cellular communication system, when N users randomly select $R_1$ preambles from the random access preamble set, and equiprobably initiate random accesses on $R_2$ RACH resources configured by the base station, a utilization rate η of the RACH resources is defined as a ratio of the total quantity of S states ($N_S$) to the total quantity of S states, the total quantity of I states ($N_I$) and the total quantity of C states $N_C$ on all the RACH resources detected by the base station, and η may be denoted by $$\eta = \frac{N_S}{N_S + N_I + N_C} = \frac{N_S}{R_1 R_2},$$

where $N_S$ is a function of the quantity N of users, the quantity K of antennas of the base station, the total quantity $R_1$ of preambles in the random access preamble sets, and the quantity $R_2$ of RACH resources configured by the base station. However, unlike the conventional cellular communication system, an expression of $N_S$ cannot be written intuitively any longer as $N_S$ in the conventional cellular network. Therefore, the base station can no longer rely solely on a requirement of the required utilization rate η of the RACH resources to intuitively configure the quantity $R_2$ of RACH resources.

Embodiment 2

Figure 3:
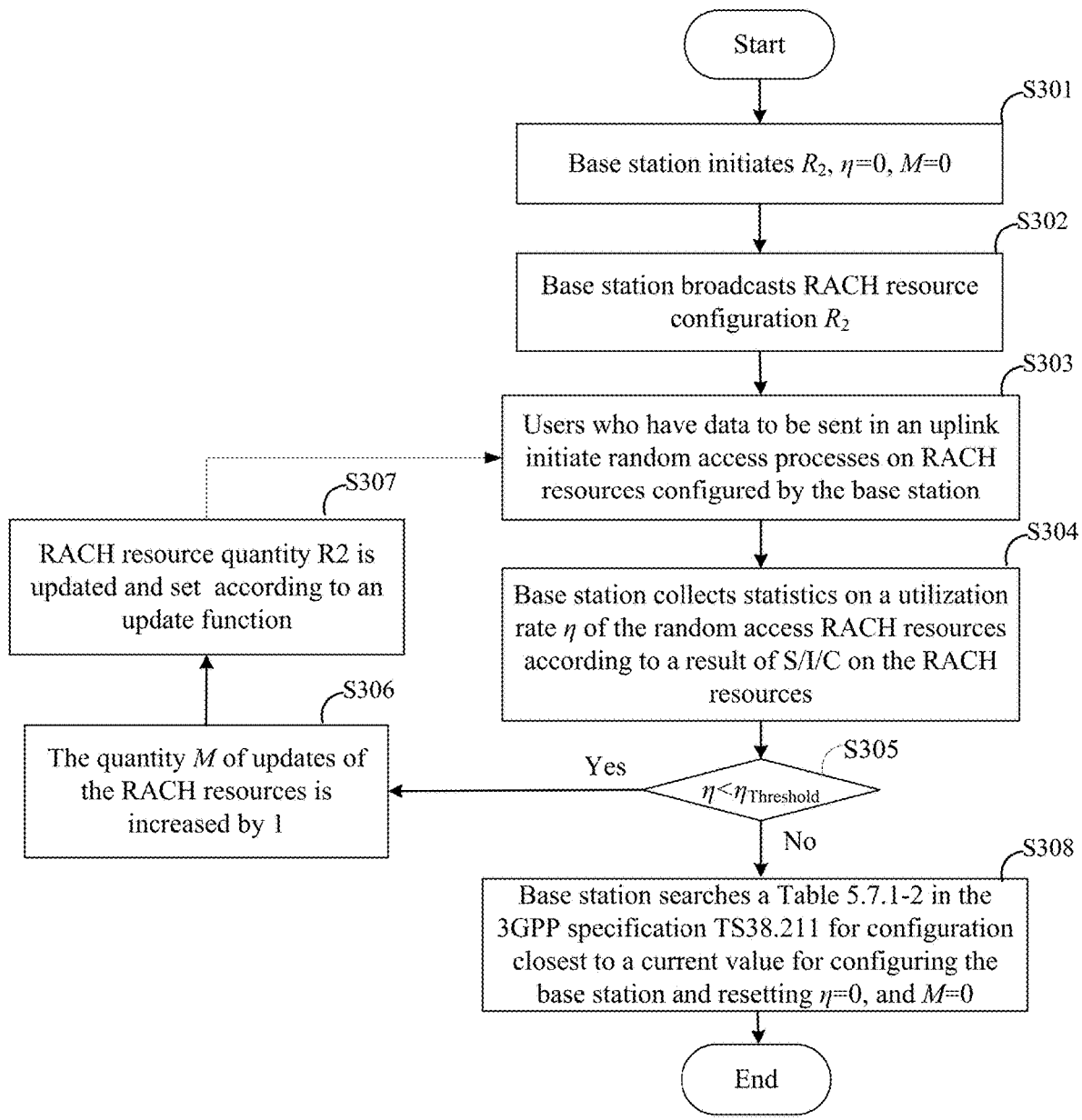
FIG. 3 is a flowchart of a method for configuring and updating uplink random access resources according to the present disclosure.

Based on Embodiment 1, Embodiment 2 of this application provides a method for updating configuration of random access resources shown in FIG. 3 applicable to the network architecture in Embodiment 1.

Step 1: A base station initializes and configures available random access resources $R_2$, that is, randomly provides an optional RACH configuration in Table 5.7.1-2 in the National Standardization Organization 3GPP specification TS38.211. In addition, an initial value of a utilization rate η of the RACH resources is 0, and the quantity M of updates of the RACH resources is 0.

Step 2: The base station broadcasts configuration of the available random access RACH resources $R_2$ through a system information block (SIB2).

Step 3: One or more users who have data to be sent in an uplink initiate one or more random access processes on one or more RACH resources configured by the base station.

Step 4: The base station collects statistics on the utilization rate η of the RACH resources according to the total quantity of S states ($N_S$), the total quantity of I states ($N_I$), and the total quantity of C states $N_C$ on all detected RACH resources.

$$\eta = \frac{N_S}{N_S + N_I + N_C} = \frac{N_S}{R_1 R_2}$$

Herein, in an MIMO system in which a base station is provided with K antennas, the quantity of users who initiate random accesses on a RACH resource is represented by N, and a result on the RACH resource is represented by F. The S/I/C states are defined as follows:

$$F = \begin{cases} I, & \text{if } N = 0 \\ S, & \text{if } 1 \leq N \leq K \\ C, & \text{if } N > K \end{cases}$$

Step 5: The base station compares the statistical utilization rate η of the random access RACH resources with a preset utilization rate threshold $\eta_{Threshold}$ of the random access RACH resources, and determines whether η exceeds the preset threshold $\eta_{Threshold}$. If yes, step 6 is performed; otherwise, step 8 is performed.

Step 6: The base station increases a value of the quantity M of updates of the RACH resources by 1.

Step 7: The base station obtains the updated quantity $R_2$ of RACH resources according to a RACH resource update function, where the update function is as follows:

$$\overline{R_2} = R_2 + \lceil \alpha_M R_2 \rceil$$

where a non-negative number $\alpha_M$ is a weight value when the base station updates the RACH resources for an $M^{th}$ time, and is used for controlling the update amount of the resources; $\lceil \cdot \rceil$ represents a round-up operation for ensuring that the quantity of RACH resources after each update is an integer multiple of the minimum quantity of resource blocks in a cellular communication system; $\lceil \alpha_M R_2 \rceil$ is the quantity of newly added RACH resources such that a configured utilization rate of the RACH resources is not less than a set threshold. Herein, it is ensured, by adjusting the non-negative number $\alpha_M$, that the quantity added each time is close to an optimal configuration, and step 3 is returned.

Step 8: The base station searches for configuration closest to the value $R_2$ in the Table 5.7.1-2 in the 3GPP specification T S38.211 for configuration; and the base station resets the utilization rate η of the RACH resources to the initial value 0, sets the quantity M of updates of the RACH resources to 1, and ends the update process of the RACH resources.

It should be noted that in step 2, there may be 0, 1 or more users on each RACH resource in a conventional 4G network that send respective preamble sequences. That is, I/S/C on each RACH resource is explained as follows: If a feedback result is I, it indicates that the preamble sequence sent by the user is not detected on the RACH resource; if the feedback result is S, it indicates that the preamble sequence sent by one user is detected, and therefore the user successfully sends the preamble sequence; and if the feedback result is C, it indicates that the preamble sequences sent by a plurality of users are detected, and a collision occurs. In the 5G NR system, a multi-antenna MIMO technology is used, so that when the base station is provided with K receiving antennas, the base station may distinguish sequences/signals of K users at most each time. Therefore, in this case, I/S/C on each RACH resource is explained as follows: If a feedback result is I, it indicates that the preamble sequence sent by the user is not detected on the RACH resource; if the feedback result is S, it indicates that the preamble sequences sent by K users are detected, and therefore the users successfully send the preamble sequences; and if the feedback result is C, it indicates that the preamble sequences sent by more than K users are detected, and a collision occurs.

Figure 4:
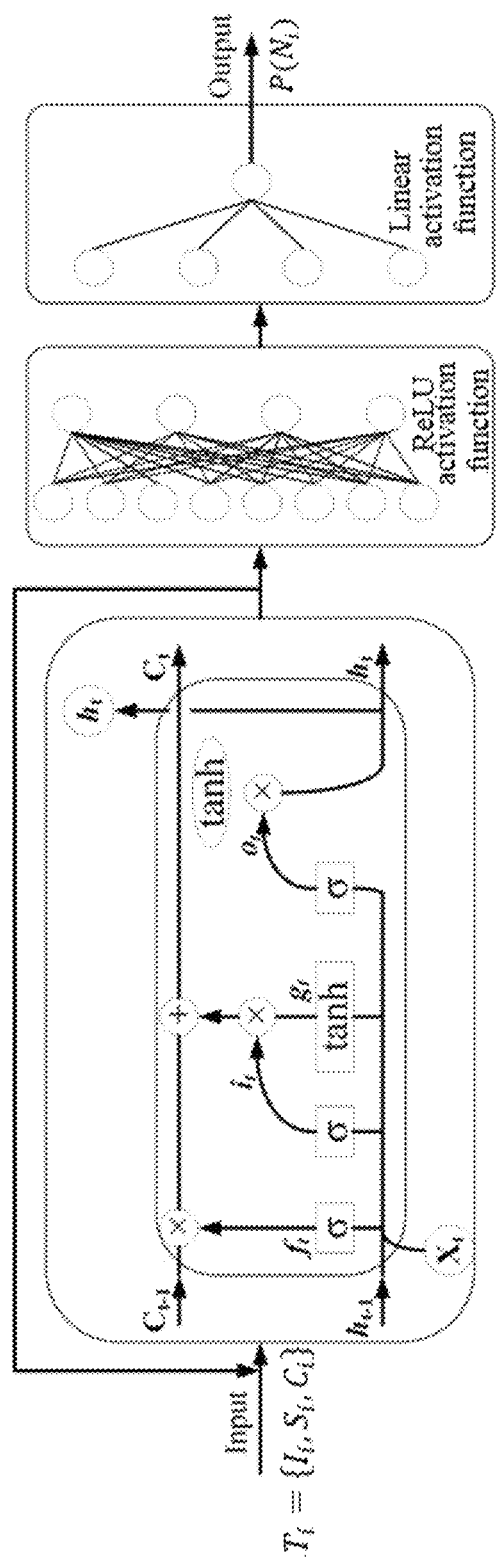
FIG. 4 is a flowchart that a base station in an MIMO system estimates the quantity of users by using an LSTM network.

FIG. 4 is a flowchart in which a base station in an MIMO system estimates the quantity of users by using an LSTM network in this embodiment. In the MIMO system, when the base station configures RACH resources, an initial value of N is 0 because the quantity of users in a random access cannot be accurately obtained. Whenever the RACH resources are configured and updated, the base station re-predicts and estimates a value of N. N is obtained through paging configuration of the base station in a non-contention-based random access manner, and is estimated and obtained by the base station, according to a detection result of previous random access preambles, using the LSTM shown in FIG. 4 in a contention-based random access manner. During the detection of the preambles in the contention-based random access manner, the base station may obtain states of the preambles, that is, the S/I/C state of each preamble sent by the base station in the MIMO system. A state set of the preamble on an $i^{th}$ random access timeslot in the MIMO system is represented by a triplet $T_i = \{I_i, S_i, C_i\}$.

The base station in the MIMO system estimates the quantity $N_i$ of active users by using an observed state of the random variable $T_i$.

$$N_i = \begin{cases} \sum_{k=1}^{BW} N_{i-k,F}(k) + N_{i,A} & i > BW \\ \sum_{k=1}^{i-1} N_{i-k,F}(k) + N_{i,A} & i \le BW \end{cases},$$

where BW is the quantity of timeslots included in a backoff window length of a random access; $N_{i,A}$ is the quantity of newly activated users waiting to initiate random accesses when new data arrives on the $i^{th}$ random access timeslot; and $N_{i-k,F}(k)$ is the quantity of users who reinitiate random accesses on the $i^{th}$ random access timeslot after the random accesses fail due to a preamble collision on an $(i-k)^{th}$ random access timeslot. Therefore, a detection result $P(N_i)$ of the random accesses (that is, a probability distribution function of the quantity $N_i$ of activated users) is modeled as follows:

$$\arg\max_{N_i} P(N_i) \text{ s.t. } T_k, k = 1, \ldots, i$$

where $T_k$ (k=1, . . . , i) is an observed value of the S/I/C state of each preamble sent by the base station in the MIMO system, $N_i$ is a result that needs to be predicted, and $T_k$ and $N_i$ are respectively used as an input and an output of a designed neural network.

In this embodiment, the base station in the MIMO system predicts and estimates the quantity of users in the random accesses based on the LSTM network. The network includes an LSTM unit and two FC networks. A recurrent line length of an LSTM network 600 is a maximum value of the BW length. For the LSTM unit, an input is the state set of the preambles on the $i^{th}$ random access timeslot in the MIMO system, that is, the triplet $T_i = \{I_i, S_i, C_i\}$. Therefore, the quantity of input nodes is set to 3. The larger quantity of hidden layer nodes indicates better training performance of the network, but the training complexity also increases accordingly. To balance the system performance and reduce the complexity, the quantity of hidden layer nodes is set to be the same as the BW length. An FC network A700 is has an input of a BW dimension and an output of a BW/2 dimension; an FC network B800 has an input of a BW/2 dimension, and an output of 1 dimension; and for the FC networks (the FC network A700 and the FC network B800), an output dimension is reduced from the BW dimension to the 1 dimension, and the output is used for estimating and predicting the probability distribution function $P(N_i)$ of the quantity $N_i$ of active users waiting to initiate random accesses in the MIMO system.

In this embodiment, when the base station in the MIMO system estimates, by using the LSTM network, the quantity $N_i$ of users who initiate random accesses on any random access timeslot, a memory window length L of the LSTM network is required to be set to a larger value, because users in the random access collision need to randomly select a backoff value between 0 and BW to reinitiate random accesses when reinitiating the random accesses. If L is set to be too small, the LSTM network fails to memorize all retransmission users; and correspondingly, if L is set to be too large, computer's memory resources are wasted. By properly setting L, redundant information can be discarded, and a training of a neural network model can also be accelerated. The memory window length of the LSTM network is set to a maximum BW length during training.

Figure 5:
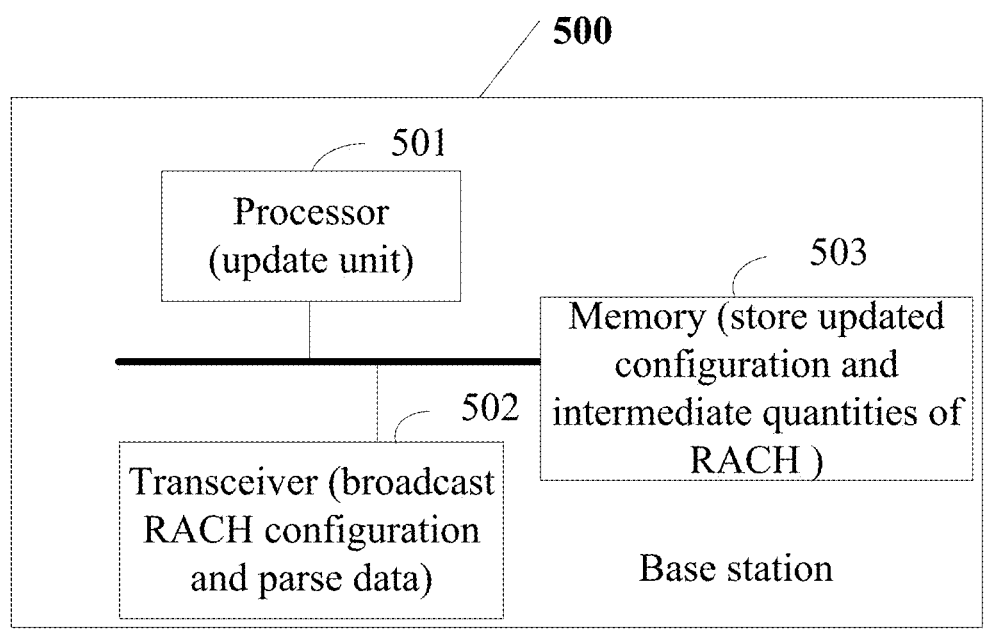
FIG. 5 is a schematic structural diagram of a base station according to an embodiment of the present disclosure.

FIG. 5 is a schematic structural diagram of a base station according to an embodiment. The base station in the embodiment of the present disclosure may be the base station provided in any embodiment shown in FIG. 2 to FIG. 4. The base station 500 shown in FIG. 5 includes: a processor 501 and a transceiver 502. The processor 501 is configured to update parameter values in a RACH process, the transceiver 502 is configured to implement functions such as broadcast of RACH configuration and parse the received preamble, and the processor 501 and the transceiver 502 are connected through, for example, a bus. The base station 500 may further include a memory 503, which is configured to store updated configuration information of RACH and intermediate quantities in the RACH process, for example, statistics of the S/I/C states. It should be noted that the quantity of processors 501 and the quantity of transceivers 502 are not limited in this embodiment, and a structure of the base station 500 does not constitute a limitation to this embodiment. The transceiver 502 may be implemented by using a receiver and a transmitter.

In this embodiment, the processor 501 may be a central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The processor may implement or execute logical blocks, modules, and circuits with reference to the present disclosure. The processor 501 may alternatively be a combination for implementing computing functions, such as a combination including one or more microprocessors or a combination of the DSP and the microprocessor.

The memory 503 may be a read-only memory (ROM), another type of static storage device that can store static information and instructions, a random access memory (RAM), or another type of dynamic storage device that can store information and instructions, or may be an electrically erasable programmable read-only memory (EEPROM), a compact disc read-only memory (CD-ROM), or another optical disc storage, optical disc storage (including a compact disc, a laser disc, an optical disc, a digital versatile disc, a Blu-ray disc, or the like), a disk storage medium or another magnetic storage device, or any another medium that can be configured to carry or store expected program codes with instructions or in the form of a data structure to be accessed by a computer, but the present disclosure is not limited thereto.

During specific implementation, the processor 501 and the transmitter 502 described in this embodiment of the present disclosure can perform the random access procedure in the existing cellular wireless communication system shown in FIG. 2 or the random access method performed by the base station in the present disclosure shown in FIG. 3, and details are not described herein again.

The computer-readable storage medium may be an internal storage unit of any base station, for example, a hard disk or a memory of the base station. The computer-readable storage medium may alternatively be an external storage device of the base station, such as a plug-in hard disk equipped on the base station, a smart media card (SMC), a secure digital (SD) card, or a flash card. Further, the computer-readable storage medium may further include both an internal storage unit of the base station and an external storage device. The computer-readable storage medium is configured to store a computer program and other programs and data required by the base station. The computer-readable storage medium may alternatively be configured to temporarily store data that is outputted already or is about to be outputted.

The embodiments in this specification are described in a progressive manner. Description of each of the embodiments focuses on differences from other embodiments, and reference may be made to each other for the same or similar parts among the embodiments.

Although the principle and implementations of the present disclosure are described by using specific examples in this specification, the descriptions of the foregoing embodiments are merely intended to help understand the method and the core idea of the method of the present disclosure. In addition, a person of ordinary skill in the art may make modifications to the specific implementations and application range according to the idea of the present disclosure. In conclusion, the content of this specification shall not be construed as a limitation to the present disclosure.

What is claimed is:

1. A method for configuring and updating random access resources in a multi-antenna multiple-input multiple-output (MIMO) environment, wherein the method comprises:

step 1: initializing a base station: configuring available random access channel (RACH) resources $R_2$; and setting an initial value of a utilization rate j of the RACH resources to 0, and an initial value of a quantity M of updates of the RACH resources to M=0;

step 2: broadcasting, by the base station, the available RACH resources $R_2$ through a system information block SIB2, wherein when the base station is provided with K receiving antennas, a maximum spatial degree of freedom is K, and the base station distinguishes sequences or signals of K users each time;

step 3: initiating, by users who have data to be sent in an uplink, random access processes on the RACH resources configured by the base station;

step 4: configuring a plurality of antennas for each base station in an MIMO system, wherein a formed spatial degree of freedom is represented by K; a quantity of active users waiting to initiate random accesses on the RACH resources is represented by N, a result on the RACH resources is represented by F, and an S state, an I state, and a C state are redefined; an initial value of N is 0, and when the base station re-predicts and estimates a value of N, in a non-contention-based random access manner, the quantity N of active users waiting to initiate the random accesses on the RACH resources is obtained through paging configuration of the base station; and in the contention-based random access manner, the base station estimates and obtains, according to a detection result of previous random access preambles by using a long short-term memory (LSTM) network, the quantity N of active users waiting to initiate the random accesses on the RACH resources; the S state, the I state, and the C state are defined as follows:

$$F = \begin{cases} I, & \text{if } N = 0 \\ S, & \text{if } 1 \leq N \leq K \\ C, & \text{if } N > K \end{cases}$$

wherein the I state indicates that the feedback result of the RACH resource is the idle state, the S state indicates that the user successfully sends the preamble sequence on the RACH resource; the C state indicates that a collision occurs on the RACH resource; and the initial value of N is 0;

when the RACH resource configuration is updated each time, the base station re-predicts and estimates a value of N, wherein in the non-contention-based random access manner, the quantity N of active users waiting to initiate the random accesses on the RACH resources is obtained through paging configuration of the base station; in a contention-based random access manner, the base station estimates and obtains, according to the detection result of previous random access preambles by using the LSTM network, the quantity N of active users waiting to initiate the random accesses on the RACH resources; during detection of the preamble in the contention-based random access manner, the base station obtains a state of the preamble; a state set of the preamble on an it h random access timeslot in the MIMO system is represented by using a triplet $T_i=\{I_i, S_i, C_i\}$; and the base station in the MIMO system estimates the quantity $N_i$ of active users by using states of observed random variables $T_i$, $$N_i = \begin{cases} \sum_{k=1}^{BW} N_{i-k,F}(k) + N_{i,A} i > BW \\ \sum_{k=1}^{i-1} N_{i-k,F}(k) + N_{i,A} i \leq BW \end{cases}$$

wherein BW is a quantity of timeslots comprised in a backoff window (BW) length of a random access; $N_{i,A}$ is a quantity of newly activated users waiting to initiate random accesses when new data arrives on the $i^{th}$ random access timeslot; $N_{i-k,F}(k)$ is a quantity of users who reinitiate random accesses on the $i^{th}$ random access timeslot after the random accesses fail due to a Preamble collision on an $(i-k)^{th}$ random access timeslot; and a detection result $P(N_i)$ of the random accesses is modeled as follows:

$$\arg\max_{N_i} P(N_i) \text{ s.t. } T_k, k = 1, \ldots, i \qquad \text{P1}$$

wherein $T_k$ is an observed value of the S/I/C state of each preamble sent by the base station in the MIMO system, $k=1, \ldots, i$; and $N_i$ is a result that needs to be predicted, and $T_k$ and $N_i$ are used as an input and an output of the LSTM network respectively;

the base station calculates a utilization rate of the RACH resources according to a total quantity of S states, a total quantity of I states, and a total quantity of C states on all detected RACH resources:

$$\eta = \frac{N_S}{N_S + N_I + N_C} = \frac{N_S}{R_1 R_2}$$

wherein $N_S$ is the total quantity of S states on all the RACH resources; $N_I$ is the total quantity of I states on all the RACH resources; $N_C$ is the total quantity of C states on all the RACH resources; $R_1$ is a quantity of preambles in a random access preamble set; $R_2$ is a quantity of available RACH resources; and $\eta$ is the utilization rate of all the RACH resources;

step 5: comparing, by the base station, the statistical utilization rate $\eta$ of the RACH resources with a preset utilization rate threshold $\eta_{Threshold}$ of the RACH resources, and determining whether $\eta$ exceeds the preset threshold $\eta_{Threshold}$; and performing step 6 and step 7 when $\eta < \eta_{Threshold}$ is met; when $\eta \geq \eta_{Threshold}$ is met, performing step 8;

step 6: increasing, by the base station, a value of the quantity M of updates of the RACH resources by 1: $M=M+1$;

step 7: obtaining, by the base station, an updated quantity $\overline{R_2}$ of RACH resources according to a RACH resource update function, wherein the update function is as follows:

$$\overline{R_2} = R_2 + \lceil \alpha_M R_2 \rceil$$

wherein a non-negative number $\alpha_M$ is a weight value when the base station updates the RACH resources for an $M^{th}$ time, $\lceil \alpha_M R_2 \rceil$ indicates a round-up operation on a product of $\alpha_M$ and $R_2$; and the non-negative number $\alpha_M$ is adjusted to ensure that a number increased each time is close to an optimal configuration, and step 3 to step 5 are repeated until $\eta \geq \eta_{Threshold}$; and step 8: searching for configuration of the RACH resources closest to a current value $R_2$ in a 3GPP relevant standard table, to configure the base station, resetting the utilization rate $\eta$ of the RACH resource in the base station to the initial value 0, and the quantity M of updates of the RACH resources to M=0, and ending a update process of the RACH resources.

2. The method for configuring and updating the random access resources in the multi-antenna MIMO environment according to claim 1, wherein in step 1, the base station comprises: a processor and a transceiver, wherein the processor is connected to the transceiver; and the processor is configured to update parameter values in a RACH process, and the transceiver is configured to implement broadcast of RACH configuration and parse received preambles.

3. The method for configuring and updating the random access resources in the multi-antenna MIMO environment according to claim 1, wherein in step 1, the base station further comprises a memory, and the memory is configured to store updated configuration information of RACH and intermediate quantities in a RACH process.

4. The method for configuring and updating the random access resources in the multi-antenna MIMO environment according to claim 2, wherein the transceiver comprises is a receiver and a transmitter; the processor is at least one of a central processing unit, a general-purpose processor, a digital signal processor, an application-specific integrated circuit, a field programmable logic gate array, another programmable logic device, a transistor logic device, and a hardware component; and the processor and the transmitter are connected through a bus.

5. The method for configuring and updating the random access resources in the multi-antenna MIMO environment according to claim 3, wherein the memory is a read-only memory, a static storage device, a random access memory, a dynamic storage device, an electrically erasable programmable read-only memory, a compact disc read-only memory, an optical disk storage, or a magnetic disk storage medium.

6. The method for configuring and updating the random access resources in the multi-antenna MIMO environment according to claim 1, wherein in step 2, when the base station is provided with the K receiving antennas, the maximum spatial degree of freedom is K, and idle, success, and collision on each RACH resource are set as follows:

when a feedback result of a RACH resource is the I state, it indicates that a preamble sequence sent by the user is not detected on the RACH resource, and the RACH resource is idle;

when the feedback result of the RACH resource is the S state, it indicates that at least one but not more than a number of preamble sequences sent by the users are detected, and the users successfully send the preamble sequences on the RACH resource; and when the feedback result of the RACH resource is the C state, it indicates that the preamble sequences sent by more than K users are detected, and a collision occurs on the RACH resource.

* * * * *